US012605876B2

(12) United States Patent
Caccia et al.

(10) Patent No.: US 12,605,876 B2
(45) Date of Patent: Apr. 21, 2026

(54) METHOD AND APPARATUS FOR ADJUSTING THE THICKNESS OF A PLASTIC FILM PRODUCED BY CAST EXTRUSION PROCESS

(71) Applicant: SYNCRO S.R.L., Busto Arsizio (IT)

(72) Inventors: Gabriele Caccia, Busto Arsizio (IT); Paolo Rizzotti, Novara (IT); Enrico Nappa, Induno Olona (IT); Fabiano Sarnari, Ravenna (IT)

(73) Assignee: SYNCRO S.R.L., Busto Arsizio Va (IT)

( * ) Notice: Subject to any disclaimer, the term of this patent is extended or adjusted under 35 U.S.C. 154(b) by 84 days.

(21) Appl. No.: 18/689,926

(22) PCT Filed: Sep. 7, 2022

(86) PCT No.: PCT/IB2022/058416
§ 371 (c)(1),
(2) Date: Mar. 7, 2024

(87) PCT Pub. No.: WO2023/037260
PCT Pub. Date: Mar. 16, 2023

(65) Prior Publication Data
US 2024/0367364 A1 Nov. 7, 2024

(30) Foreign Application Priority Data

Sep. 8, 2021 (IT) ........................ 102021000023153

(51) Int. Cl.
*B29C 48/92* (2019.01)
*B29C 48/00* (2019.01)
(Continued)

(52) U.S. Cl.
CPC .......... *B29C 48/92* (2019.02); *B29C 48/0018* (2019.02); *B29C 48/0022* (2019.02);
(Continued)

(58) Field of Classification Search
None
See application file for complete search history.

(56) References Cited

U.S. PATENT DOCUMENTS 3,890,078 A 6/1975 Straumanis

FOREIGN PATENT DOCUMENTS

DE 102013100866 A1 7/2014
GB 1444757 A 8/1976
(Continued)

OTHER PUBLICATIONS

Machine Translation of JPH07308953.*
(Continued)

*Primary Examiner* — Christopher T Schatz
(74) *Attorney, Agent, or Firm* — LUCAS & MERCANTI, LLP

(57) ABSTRACT

A method for producing reels of plastic film by cast extrusion process is described. The steps include causing the film to flow from an extrusion head slit, adjusting its thickness, drawing the exiting film with an internally cooled roll, winding the film downstream of the roll to form reels of film, measuring the thickness of the film and adjusting the thickness of the film based on the thickness measurements provided by the thickness measuring device. The method further includes measuring a reference quantity of the film reels produced, comparing the reference quantity measured value with a design value of the reference quantity corresponding to the design value of the thickness of the film and if the measured value is different from the design value of the reference quantity, acting on adjustment means and/or on the thickness measuring device to obtain a desired film thickness.

9 Claims, 5 Drawing Sheets

(51) Int. Cl.
| | | |
|---|---|---|
| B29C 48/08 | (2019.01) | |
| B29C 48/28 | (2019.01) | |
| B29C 48/88 | (2019.01) | |

(52) U.S. Cl.
CPC .............. B29C 48/08 (2019.02); B29C 48/28 (2019.02); B29C 48/914 (2019.02); *B29C 2793/009* (2013.01); *B29C 2948/92152* (2019.02); *B29C 2948/92447* (2019.02); *B29C 2948/92647* (2019.02); *B29C 2948/92904* (2019.02)

(56) References Cited

FOREIGN PATENT DOCUMENTS

| | | | |
|---|---|---|---|
| JP | H01314136 | A | 12/1989 |
| JP | H06106605 | A | 4/1994 |
| JP | H07308953 | A | 11/1995 |
| WO | 2018001447 | A1 | 1/2018 |

OTHER PUBLICATIONS

International Search Report and Written Opinion for Corresponding International Application No. PCT/IB2022/058416, Dec. 16, 2022, 11 pages.

* cited by examiner

METHOD AND APPARATUS FOR ADJUSTING THE THICKNESS OF A PLASTIC FILM PRODUCED BY CAST EXTRUSION PROCESS

CROSS-REFERENCE TO RELATED APPLICATIONS

This application is a 371 of PCT/IB2022/058416, filed Sep. 7, 2022, which claims the benefit of Italian Patent Application No. 102021000023153, filed Sep. 8, 2021.

FIELD OF THE INVENTION

The present invention relates generally to a method, and related apparatus, for the production of plastic film reels by cast extrusion process. More specifically, the present invention relates to a method, and related apparatus, for the production of plastic film reels by cast extrusion process wherein the thickness of the film can be adjusted by means of a special adjustment system.

BACKGROUND OF THE INVENTION

The cast extrusion process is commonly used to produce a plurality of plastic film reels obtained by longitudinal cuts on the extruded strip.

FIGS. 1 to 3 of the enclosed drawings schematically show a typical example of an apparatus for the production of plastic film by cast extrusion process. With reference to these figures, the plastic film (denoted F) is poured from an extrusion head 10 through a slit 12 (visible in FIG. 2), then drawn by an internally cooled roll 14 (known as "chill roll") and finally wound onto cardboard tubes T by means of a winding unit 16 to form a series of reels B (in the illustrated example, four reels).

As a result of the drawing by the roll 14, the film F undergoes significant and sudden elongation and thinning which generate an equally significant transverse shrinkage of the film and an irregularity in the thickness in the region of the side bands of the film which extend from the two side edges towards the centre of the film for a significant width (often more than 150 mm). These side bands, called "edge trims", are removed prior to the final winding of the film by means of special longitudinal cutting devices 18, which are generally positioned in the winding unit 16. The position of these longitudinal cutting devices 18 is adjustable in the direction of the width of the film to allow adjustment of the width of the side bands removed from the film.

Similar longitudinal cutting devices, denoted 20, are used to divide the film into a series of webs (in the present case four webs), each of which is intended to be wound onto a respective cardboard tube T to form a respective reel B. Each longitudinal cutting device 20 typically comprises a pair of longitudinal blades arranged at a distance from each other. Separation between the various film bands by longitudinal cutting devices 20 of this type therefore generates narrow film bands, known as "blade trims", which are removed and discarded or reused in-line with machines dedicated to their recovery. Alternatively, the longitudinal cutting devices 20 may comprise single longitudinal blades, followed by devices, such as deflector frames or spreader rollers, arranged to move the bands away from each other after cutting. This prevents the generation of "blade trims".

A widespread example of plastic film production by cast extrusion process that is well representative for a basic understanding of the problems addressed by the present invention is given by the cast extrusion apparatuses for the production of extensible film (known as "stretch" film). The classic stretch film reel for automatic wrapping machines has a width of 500 mm and is wound onto a 3" (76.2 mm) diameter cardboard tube up to an outer diameter of 240-250 mm, equivalent to a total mass of approximately 17 kg. The length of wound film is variable depending on its thickness. In this case, the flat extrusion head will have a width equal to a multiple of 500 mm, with a roughly constant increase to take into account transverse shrinkage and blade trims. For example, to produce two 500 mm wide reels the extrusion head will have a width of 1550-1600 mm, for three reels the extrusion head will have a width of 2050-2100 mm, for four reels the width of the extrusion head will be 2550-2600 mm, and so on for more reels.

Any dispersion of film thickness in the transverse direction, i.e. in a direction perpendicular to the direction of film advancement, is detected by means of a thickness measuring device 22 positioned downstream of the roll 14 and upstream of the winding unit 16. This thickness measuring device normally takes the form of a transverse scanner and may operate according to various techniques, such as absorption or transmission of radiation emitted by electromagnetic and/or radioactive sources (infrared, UV, X-rays, beta rays, gamma rays, etc.), optical techniques by interferometry, shadowing or other, ultrasound-based techniques or a combination of these techniques.

The measurements made by the thickness measuring device 22 are used by a thickness adjustment system comprising an electronic control unit 24 and a plurality of adjustment actuators 26, normally placed in the extrusion head 10 and configured to act on a deformable lip of the extrusion head to vary the size of the slit 12 through which the film is poured. On the basis of the measurements provided by the thickness measuring device 22, the electronic control unit 24 properly controls the adjustment actuators 26 so as to compensate for any deviations in either direction (increase or decrease) in the thickness of the film, so as to obtain a film that is as flat as possible and in any case below very strict and narrow tolerance levels.

After an adjustment period, as short as possible, as the dispersion of the thickness profile decreases until it is comprised within the predetermined tolerance limits, the film produced reaches the established thickness flatness and, at the same time, the reels achieve a desired level of geometric quality in terms of:

cylindricity, compactness (homogeneous and correct), absence of creases characterised by the alternating presence in the reel of less dense zones and compact zones (the former containing air trapped between the layers of film thinner than the average value, the latter being harder and denser due to the repeated overlapping of layers of film thicker than the average value resulting in a larger outer diameter than the previous zones), and constancy of mass (in that each reel must have a well-defined weight, or at least a weight variable within a given range, which in the case of the stretch film reels defined above is typically between 17 and 17.1 kg, sometimes between 17 and 17.15 kg).

It should also be noted that a variation in mass of more than 0.15 kg over 17 kg, and the consequent variation in the diameter of the wound film, could generate problems during winding. A variation in diameter, even a small one, between the reels (varying in number from 2, 3 and sometimes even 4) wound on a single mandrel and pressed against a single contact roll may, in fact, give rise to vibration, misalignment and irregular introduction of air between the layers of film being wound. In addition to the commercial problem connected with the repeatability of the reel weight, there is therefore also an equally important technological problem.

The typical thickness of the stretch film in the case considered above is between a minimum of 10 microns and a maximum of 23 microns. If one considers a film thickness of 17 microns, containing the mass of each reel between 17 and 17.1 kg means containing the variation in average film thickness from reel to reel between 17 and 17.1 microns.

Detecting variations in film thickness of less than a tenth of a micron requires measuring devices with a resolution well below a tenth of a micron, which is already difficult to achieve on laboratory machines operating under static conditions and in a climate-controlled environment, and is almost impossible with measuring devices operating in-line in the factory environment. There is therefore no guarantee that the adjustment system will be able to bring the actual film thickness within a tenth of a micron.

Furthermore, reading the actual film thickness within such tight tolerances clashes with the many physical parameters that, depending on the measuring technique used by the thickness measuring device, may influence the thickness measurement.

Considering for example a thickness measuring device based on the absorption or transmission of radiation emitted by electromagnetic and/or radioactive sources, the radiation emitted by the transmitter before reaching the receiver passes successively through a first air gap, the extruded film, a second air gap and any lenses or protective membranes interposed between the emitter and the receiver. During the scan process, many variables act on the film thickness reading, overlapping with the actual variation in film thickness. These variables are, for example, related to variations in the properties of the air along the scanning direction (density, temperature, pressure, humidity and speed, the latter being understood as variations in flow, small or large air currents, turbulence, etc.), or to variations of a mechanical nature (mechanical precision of the carriages with which the measuring heads are guided, expansion or torsion, vibrations of the machine, vibrations and corrugations of the film itself, etc.), or even to variations of electronic nature of the components (amplification boards, temperature control of the components, noise, etc.).

Many of these parameters are controlled by the control system and compensated for, while others are mapped in the system as machine "calibration".

However, for each of the variables listed above, small variations during the scan or between successive scans may introduce errors into the measurement of the same order of magnitude as the limit imposed on the variation in the film thickness.

For example, a variation in air temperature of a few tenths of a degree is equivalent to a variation in measured thickness of the order of a tenth of a micron. A variation in air velocity between the measuring heads of a few metres per second (4-5 m/s caused, for example, by the opening of a factory door, by the switching on or off of a fan, by internal flows within the area in which the extrusion apparatus operates) is equivalent to a variation in measured thickness of a tenth of a micron. A variation in the distance between transmitter and receiver of 2-3 tenths of a millimetre or an angular orientation error result in a variation in measured thickness of a tenth of a micron.

Ultimately, current adjustment systems do not allow the film thickness to be controlled within a sufficiently narrow range, of the order of a tenth of a micron. As a result, the weight of the film reels produced may vary significantly, leading to the drawbacks, both of commercial and of technological nature, illustrated above.

Furthermore, in the current apparatuses there are no systems that allow to check the measurements made by the thickness measuring device and/or that allow further control, in addition to that based on the measurements made by the thickness measuring device, on the adjustment actuators on board of the extrusion head or on any other film thickness adjustment means.

SUMMARY OF THE INVENTION

It is therefore an object of the present invention to provide a method and an apparatus for the production of plastic film reels by cast extrusion process, which enable to overcome the drawbacks of the prior art discussed above.

This and other objects are fully achieved by a method and an apparatus as defined in the claims.

In summary, the invention is based on the idea of measuring a reference quantity of the produced film reels, which reference quantity depends on the film thickness, and comparing the value so measured with the design value of said reference quantity corresponding to the design value of the film thickness (i.e. with the desired value of the film thickness). If the measured value of the reference quantity of the reel is higher or lower than the design value, this will be suitably interpreted by the electronic control unit of the apparatus as a consequence of an increase or decrease in the film thickness with respect to the design value and therefore the electronic control unit of the apparatus will carry out appropriate corrective actions by acting on the adjustment means arranged to adjust the thickness of the film leaving the extrusion head and/or on the thickness measuring device arranged to measure the film thickness before the film is wound in the winding unit. An example of a corrective action that the electronic control unit can take is to recalibrate or remap the thickness measuring device based on the measurements of the above-mentioned reference quantity. For example, if the thickness profile read by the thickness measuring device was within the tolerance range, but the reel produced was found to have a value of the reference quantity corresponding to a thickness outside the tolerance range, the electronic control unit could insert an appropriate offset into the thickness measuring device that would bring the read value of the thickness back to the actual value of the thickness and then carry out the adjustment accordingly. In this way, the measurements made by the thickness measuring device can be continuously checked in a closed loop and thus be more reliable, resulting in increased performance of the thickness adjustment system.

The reference quantity that is measured may be, for example, the reel weight. If the measured value of the reel weight is higher than the design value, this means that the actual film thickness is correspondingly higher than the design thickness value. Consequently, a corrective offset will be introduced into the thickness measuring device to increase the measured value if this is not consistent with the measured reel weight, and the actuators of the adjustment system will be properly controlled to compensate for this increase in film thickness. Conversely, if the measured value of the reel weight is less than the design value, this means that the actual film thickness is correspondingly less than the design film thickness. Consequently, a corrective offset will be introduced into the thickness measuring device to decrease the measured value if this is not consistent with the measured reel weight, and the actuators of the adjustment system will be properly controlled to compensate for this reduction in film thickness.

In the case of an apparatus that produces several reels simultaneously, i.e. an apparatus in which the film leaving the flat extrusion head is cut into several webs, each of which is then wound onto a respective reel, by measuring the weight of each reel (or, more generally, by measuring for each reel the reference quantity, which depends on the film thickness) it is possible to compensate for any variations in the thickness of the corresponding film webs. In this case, the comparison with the values read by the thickness measuring device could be made, for example, on the basis of the individual film webs corresponding to the individual reels, and therefore several "zone" offsets could be introduced on the basis of the values of the reference quantity measured for each of the film reels simultaneously produced.

If the weight is chosen as the reference quantity, since the weight of a film reel also depends on the width of the film web wound onto the reel, according to a preferred mode for carrying out the method the measurement of the width of the film wound onto the reel and the comparison between the measured width value and the design width value are also provided for. With the same outer diameter of the reel, in fact, the reel weight depends not only on the thickness, but also on the width of the film. By also acquiring information on the width of the film reel, the film thickness can be adjusted more precisely.

The weight of the reels, as well as—where applicable—the width of the reels, can be measured manually, in a semi-automatic way or in a fully automatic way. In addition, the measurements of the reel weight and, where applicable, also of the reel width, can be made on each reel produced or on a sample basis, for example at regular time or cycle intervals or in the event of apparent defects in the reels produced.

As an alternative to the reel weight, it is possible to choose as the reference quantity the average outer diameter of the reel, i.e. the average diameter of outer the cylindrical surface of the reel, which can be measured using, for example, a touch probe (or similar measuring instrument) slidably mounted in a transverse direction, i.e. in a direction parallel to the axis of the reel. By moving the touch probe from one edge of the reel to the other, it is possible to detect the variations in the outer diameter of the reel resulting from the overlapping of film layers whose thickness varies in a direction parallel to the axis of the reel, and thus measure the average value of the outer diameter. In addition, the touch probe could also measure the actual width of the reel. Based on the measurement of the average outer diameter of the reel, as well as—preferably—the measurement of the width of the reel, it is possible to determine any deviations of the film thickness from the design value and, if necessary, compensate for these deviations. The average outer diameter of the reel may, however, be measured in other ways, for example by using vision means such as cameras.

With the method according to the invention it is possible to achieve levels of accuracy and repeatability in terms of reel weight and average value of the thickness of the wound film that would otherwise not be achievable with the open-loop adjustment of the current adjustment systems, based solely on measurements provided by thickness measuring devices.

BRIEF DESCRIPTION OF THE DRAWINGS

Further features and advantages of the present invention will become clearer from the following description, which is given purely by way of non-limiting example with reference to the accompanying drawings, in which.

DETAILED DESCRIPTION

Figure 1:
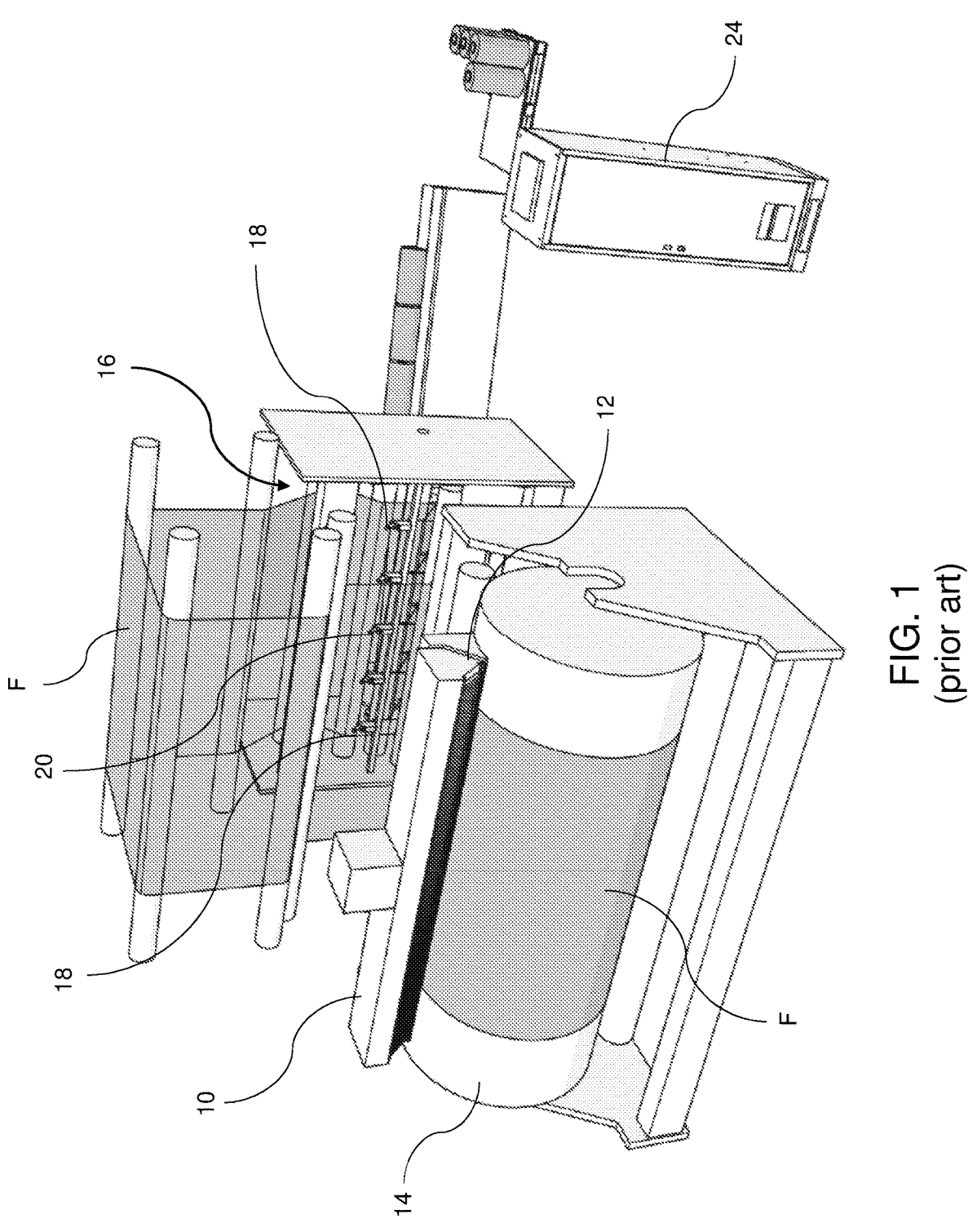
FIG. 1 is a perspective view schematically showing an apparatus for the production of plastic film reels by cast extrusion process provided with a thickness adjustment system according to the prior art.
Figure 2:
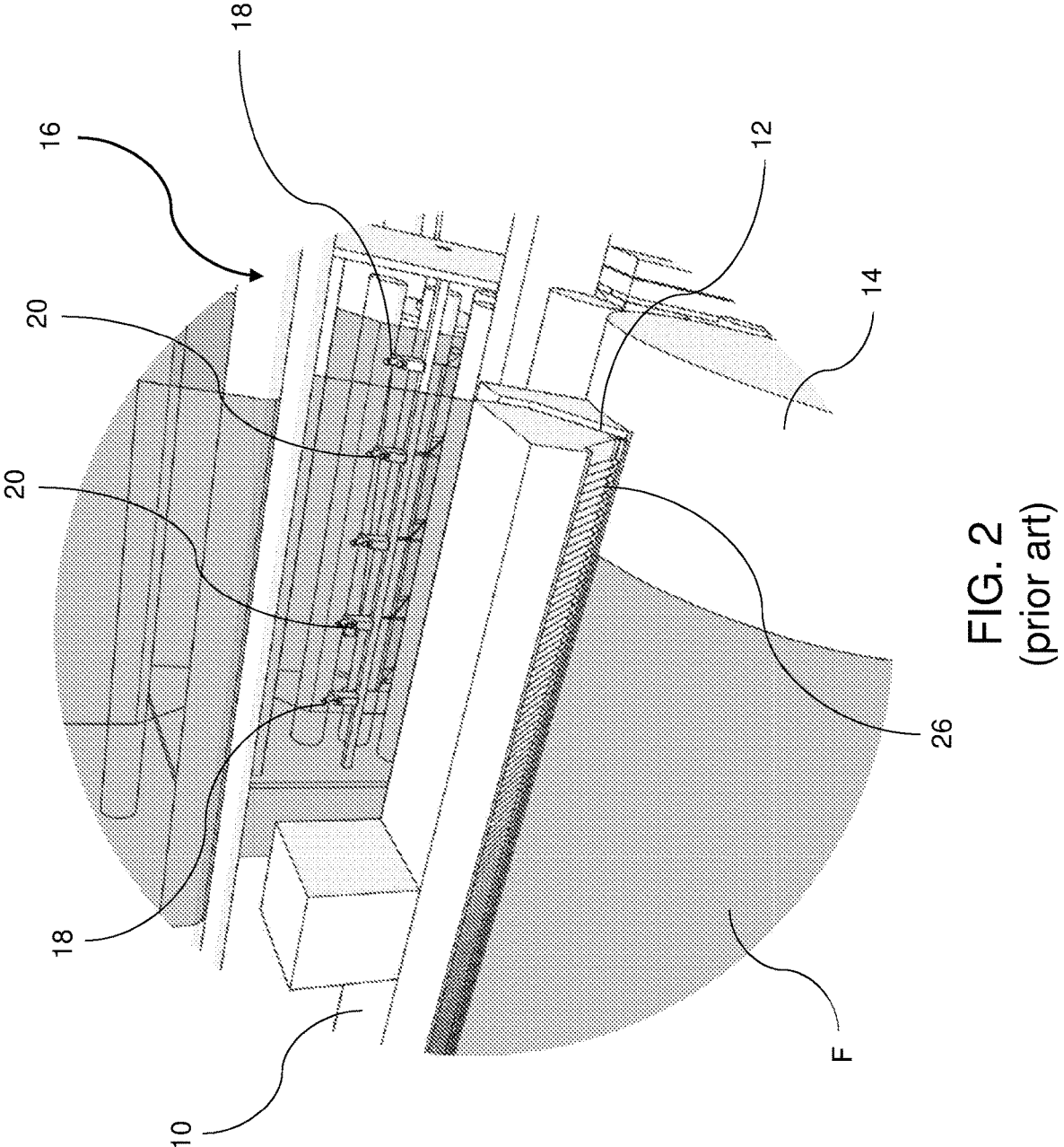
FIG. 2 is an enlarged scale view of detail A of FIG. 1.
Figure 3:
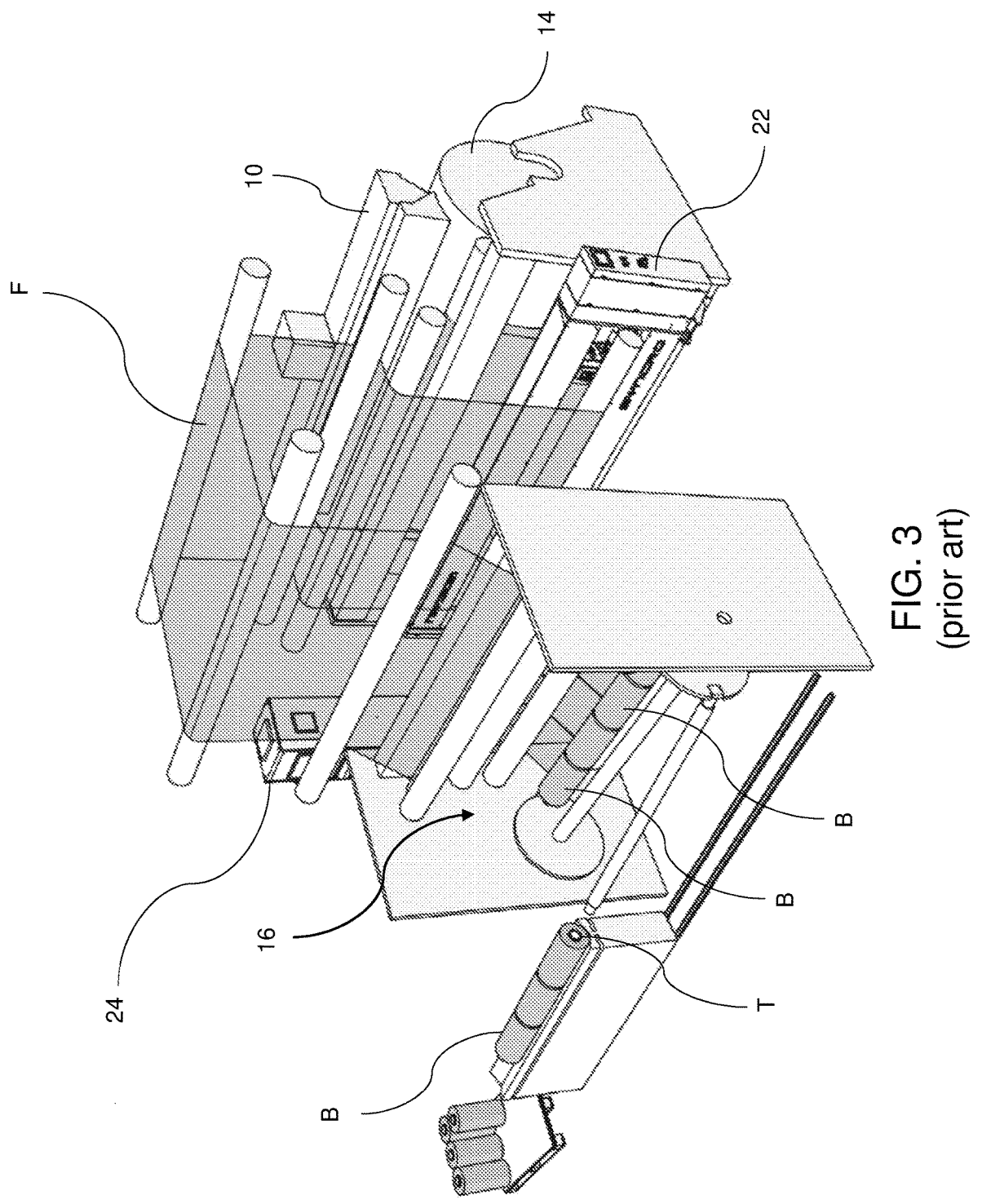
FIG. 3 is a perspective view of the apparatus of FIG. 1, from a different point of view than that of FIG. 1.
Figure 4:
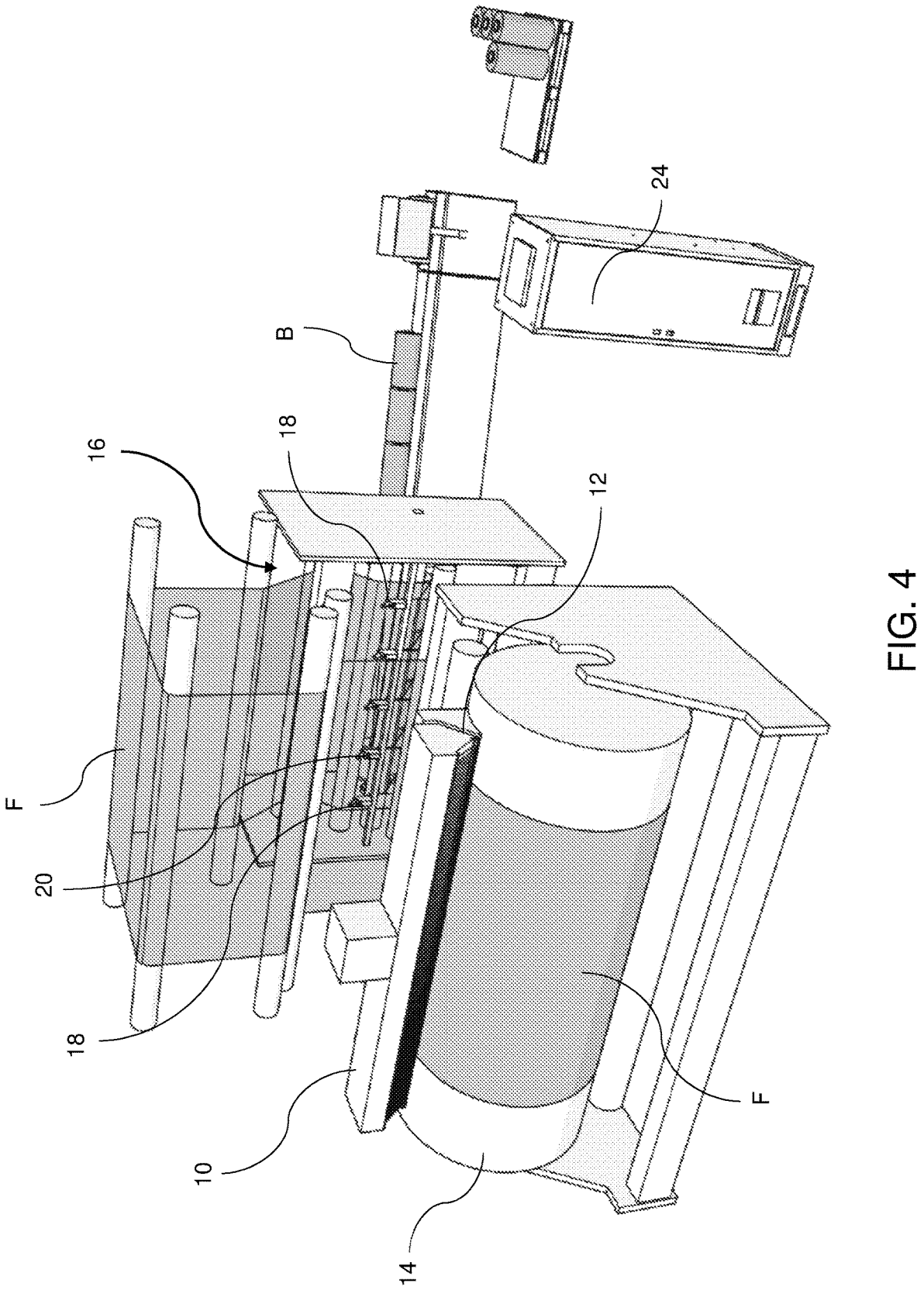
FIGS. 4 and 5 are perspective views, similar to those of FIGS. 1 and 3, schematically showing an apparatus for the production of plastic film reels by cast extrusion process provided with a thickness adjustment system according to the present invention.
Figure 5:
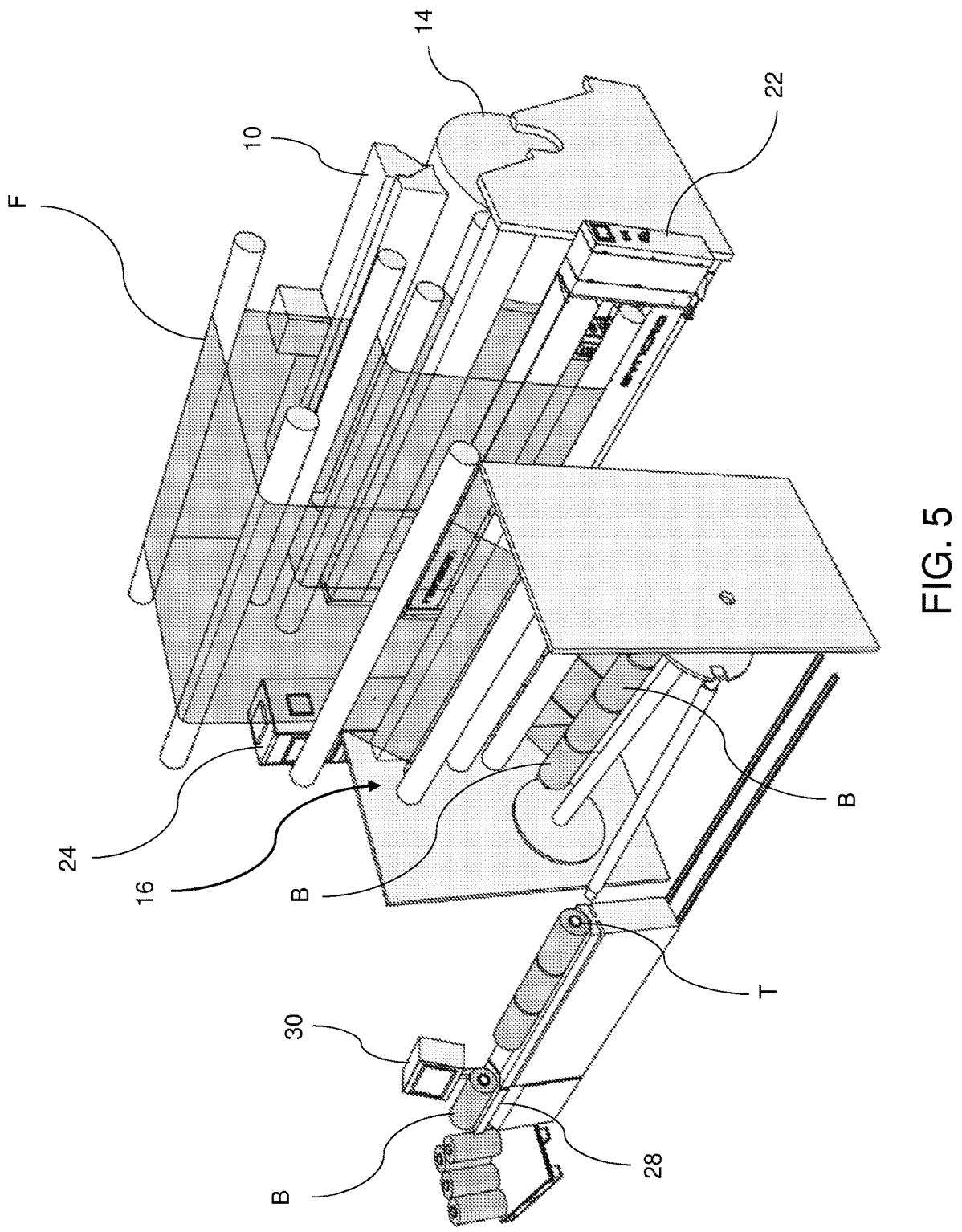

With reference to FIGS. 4 and 5, where the same reference numbers or letters have been given to parts and elements identical or corresponding to those of FIGS. 1 to 3, the present invention provides, as in the state of the art, for the use of an apparatus comprising an extrusion head 10, with a slit 12 from which the plastic film F (hereinafter simply referred to as film F) is poured, an internally cooled roll 14 ("chill roll") placed downstream of the extrusion head 10 for drawing the film F out of the slit 12 of the extrusion head 10, and a winding unit 16 placed downstream of the chill roll 14 for winding the film F onto a cardboard tube T to form a reel B. The apparatus further comprises longitudinal cutting devices 18 arranged to remove side bands ("edge trims") of the film F before the latter is finally wound in the winding unit 16. The position of these longitudinal cutting devices 18 is adjustable in the direction of the width of the film to allow adjustment of the width of the side bands removed from the film.

The invention is applicable both to the case in which the film F is wound onto a single reel B and to the case (shown in FIGS. 4 and 5) in which the film F is divided by means of longitudinal cutting devices 20 into several webs (in the present case four webs) and each web is wound by the winding unit 16 onto a respective cardboard tube T to form a respective reel B. In the remaining part of the description the term "reel" will be used in general to indicate both the case of production of a single reel at a time and the case of simultaneous production of several reels. As explained above with reference to the prior art, also in the apparatus according to the invention the longitudinal cutting devices 20, where present, may each comprise a pair of longitudinal blades arranged at a certain distance from each other or alternatively a single longitudinal blade.

The apparatus further comprises, as in the prior art described above with reference to FIGS. 1 to 3, a thickness measuring device 22, positioned downstream of the roll 14 and upstream of the winding unit 16 and arranged to detect any deviations in the film thickness in a transverse direction, i.e. in a direction perpendicular to the direction of film advancement, and a thickness adjustment system comprising an electronic control unit 24 and adjustment actuators 26, which are arranged in particular in the extrusion head and are suitably controlled by the electronic control unit 24 to adjust the thickness of the film leaving the extrusion head 10.

More specifically, the electronic control unit 24 is configured to adjust, by acting on the adjustment actuators 26, the thickness of the film leaving the extrusion head 10 on the basis of the comparison between the measurement of a reference quantity of the reel (which reference quantity depends on the film thickness) and the value of said reference quantity corresponding to the design value of the film thickness (i.e. the desired value of the film thickness). If the measured value of the reference quantity coincides with the design value of this reference quantity, this means that the film thickness at the outlet of the extrusion head 10 corresponds to the design thickness value, and therefore it will not be necessary to intervene on the adjustment actuators 26. If, on the other hand, the measured value of the reference quantity is higher or lower than the design value of this quantity, this means that the thickness of the film leaving the extrusion head 10 is correspondingly higher or lower than the design thickness value, and therefore the electronic control unit 24 will suitably control the adjustment actuators 26 to compensate for the deviation of the actual thickness of the film from the design thickness.

The weight of the reels produced can be chosen as the reference quantity. In fact, with the same width and outer diameter, the weight of the reels depends on the average film thickness. In this respect, even though there is still the possibility of weighing the cardboard tube prior to its insertion on the mandrel of the winding unit 16, the variability of the weight of the cardboard tube can be neglected and therefore it can be assumed that the weight of the cardboard tubes is constant and that therefore any variations in the reel weight are dictated solely, given the same width and outer diameter of the reel, by variations in the average film thickness.

Preferably, the reel width is measured in addition to the weight, since any variation in width, with the same average film thickness, affects the reel weight. The reel width is determined by the distance between the longitudinal cutting devices (more precisely, in the case of winding of the film on a single reel, by the distance between the longitudinal cutting devices 18, and, in the case of winding of the film on several reels, by the distance between the longitudinal cutting devices 20 as regards the central reel(s) associated with the central film web(s), and between each longitudinal cutting device 18 and the adjacent longitudinal cutting device 20 as regards the two side reels, associated with the two side film webs). This distance can be assumed to be known precisely and to be constant over time, so that it is possible to avoid measuring the width of each reel.

By measuring the weight, and possibly also the width, of the reels produced, it is possible to impose, in the event of variations in film thickness with respect to the design value, an adequate compensation to the measurements made by the thickness measuring device and/or an adequate correction of the film thickness at the outlet of the extrusion head by acting on the adjustment actuators 26. Naturally, in the case of an apparatus producing several reels at the same time, dividing the film into several webs and winding each web onto a respective cardboard tube to form a respective reel, any variations in thickness may be compensated for each film web according to the weight measurements, and possibly also the width measurements, of the corresponding reel.

The modes the weight, and possibly also the width, of the reels are measured may be of various types, from a manual mode, the simplest, to a fully automatic mode, the most complex.

In the manual mode, used in the apparatus shown in FIGS. 4 and 5, the user weighs one by one, according to an established order, by means of a scale 28 the reels B unloaded cyclically from the winding unit 16 and, for each reel, enters the corresponding measured weight value in a user interface 30 of the thickness adjustment system. The weight values thus entered will be used by the electronic control unit 24 of the thickness adjustment system for the subsequent adjustments until new data are entered. The interval between successive weight measurements may be defined according to customer specifications and may range from a weight measurement on 100% of the reels produced to a measurement at regular time or cycle intervals, or to the occurrence of apparent defects in the reels produced.

In addition to the measured weight value, the user can also enter the width value for each reel in the user interface 30. The width value of the reels can be determined on the basis of measurements taken on the reels themselves or on the basis of measurements of the distance between the blades of the longitudinal cutting devices 18 and 20. In the latter case, the measuring operation will have to be repeated or corrected each time the blades of the longitudinal cutting devices 18 and 20 are repositioned.

The operation of acquiring the weight, and possibly also the width, of the reels may be at least partly automated by connecting the scale 28 directly to the electronic control unit 24. In this case, the user simply has to give consent to the weight acquisition by identifying the position of the reel to be associated with the weight measurement acquired by the scale 28. In addition, the scale 28 may be associated with a width measurement system, which may be of a mechanical type (e.g. a touch probe, etc.), of an optical type (e.g. a photocell, a camera, etc.), of a non-contact type (e.g. based on sonar and ultrasounds, laser, etc.) or of any other type suitable for the purpose.

The reels may be placed on the scale 28 manually but, with a view to increasing automation, the scale 28 may be associated with automatic feeding means, such as automatic belt feeders, roll feeders, rolling feeders, robotic feeders or others, to automatically place the reels to be weighed on the scale, without the need for user's intervention. According to a further mode, in the event that automatic or robotic palletising systems are provided downstream of the winding unit 16, the measurement of the weight of the reels, as well as—if provided—the measurement of the width of the reels, may be performed directly by these systems, for example by performing the weight measurement on the arm of the palletising robot itself.

Further automatic modes of measuring the width of the reels may be, for example, measuring the film web immediately before it is wound onto the reel, or acquiring the position of the blades of the longitudinal cutting devices. In case the width of the various webs is measured, this may be carried out with optical measuring devices or using devices already present on the apparatus for different purposes, such as cameras for analysing impurities and defects.

Regardless of how and where the reel width information is acquired, this information can be automatically associated with the reel weight information and managed by the electronic control unit of the apparatus to control the adjustment actuators.

This information constitutes a valid element for checking the effects of the adjustments and, together with the measurements provided by the thickness measuring device, allows closed-loop compensation strategies to be adopted, which make it possible to achieve levels of precision and repeatability of reel weight and average value of the thickness of the wound film that would otherwise not be obtainable with open-loop adjustment alone based on the thickness measurements provided by the thickness measuring device positioned between the chill roll and the winding unit. Such compensation strategies may be applied not only to correct the amount of thickness adjustment imposed by the adjustment actuators, but also as a local correction of the thickness value measured by the thickness measuring device.

Furthermore, if the actual value of the average film thickness is known from other devices present on the apparatus, such as gravimetric dosing devices, this data can be suitably used by the electronic control unit of the thickness adjustment system. The actual value of the average film thickness can, in fact, be obtained from the hourly flow rate of the apparatus, controlled by the gravimetric dosing devices, once the width of the extruded web that is wound to form the reel and the line speed are known.

As an alternative to weight, the average outer diameter of the reel, i.e. the average diameter of the outer cylindrical surface of the reel, can be used as a reference quantity and can be measured using, for example, a touch probe (or similar measuring instrument) slidably mounted in a transverse direction, i.e. in a direction parallel to the axis of the reel. By moving the touch probe from one edge of the reel to the other, it is possible to detect variations in the outer diameter of the reel, resulting from the overlapping of film layers whose thickness varies in a direction parallel to the axis of the reel, and thus measure the average value of the outer diameter. In addition, the touch probe could also measure the actual width of the reel. On the basis of the measurement of the average outer diameter of the reel, as well as—preferably—the measurement of the width of the reel, it is possible to determine any deviations of the film thickness from the design value and, if necessary, compensate for these deviations. The average outer diameter of the reel can, however, be measured in other ways, for example by using vision means such as cameras.

The present invention has been described herein with reference to preferred embodiments thereof. It is to be understood that other embodiments sharing the same inventive core, as defined in the appended claims, may be envisaged.

The invention claimed is:

1. A method for producing reels of plastic film by cast extrusion process, comprising the steps of:

a) causing the film to flow out from a slit of an extrusion head by adjusting a thickness of the film by means of an adjustment device arranged in the extrusion head, b) drawing the film exiting the extrusion head by means of an internally cooled roll, c) winding the film coming from said roll by means of a winding unit placed downstream of the roll so as to form said reels, d) measuring the thickness of the film by means of a thickness measuring device placed between the roll and the winding unit, e) controlling said adjustment device to adjust the thickness of the film based on a thickness measurement provided by the thickness measuring device, f) measuring a reference quantity of the reels thus produced, said reference quantity being a quantity that depends on the thickness of the film, g) comparing a measured value of said reference quantity with a design value of said reference quantity corresponding to a design value of the thickness of the film, and h) if the measured value differs from the design value of said reference quantity, acting on said adjustment device and/or on the thickness measuring device so that the thickness of the film corresponds to a desired value.

2. The method according to claim 1, wherein said reference quantity is a weight of each of the reels of film produced.

3. The method according to claim 1, wherein said reference quantity is an average diameter of an outer cylindrical surface of each of the reels of film produced.

4. The method according to claim 2, further comprising the steps of measuring a width of the reels of film produced and taking into account the measurement of the width thus acquired to control said adjustment device in step (h).

5. The method according to claim 2, wherein said step f) of measuring said reference quantity is performed on each reel (B) of film (F) produced.

6. The method according to claim 2, wherein said step f) of measuring said reference quantity is performed on samples of the reels (B) of film (F) produced.

7. The method according to claim 1, wherein in said step h) said adjustment device is suitably controlled based on a difference between the measured value and the design value of said reference quantity.

8. The method according to claim 1, wherein in said step h) said thickness measuring device is suitably recalibrated or remapped based on a difference between the measured value and the design value of said reference quantity.

9. The method according to claim 1, wherein prior to said winding step c) the film is divided by means of longitudinal cutting devices into several webs, wherein in said step c) each web is wound by the winding unit to form a respective reel, and wherein said steps f), g) and h) are performed each time for each of the reels simultaneously produced.

\* \* \* \* \*